(12) United States Patent
Dzafic et al.

(10) Patent No.: US 9,242,547 B2
(45) Date of Patent: Jan. 26, 2016

(54) REAR DRIVE UNIT FOR A HYBRID ELECTRIC MOTOR VEHICLE

(71) Applicant: VOLVO CAR CORPORATION, Gothenburg (SE)

(72) Inventors: Ahmet Dzafic, Molndal (SE); Mathias Jorgensson, Stenungsund (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/482,316

(22) Filed: Sep. 10, 2014

(65) Prior Publication Data

US 2015/0087476 A1 Mar. 26, 2015

(30) Foreign Application Priority Data

Sep. 24, 2013 (EP) .................................. 13185708

(51) Int. Cl.
*F16H 3/72* (2006.01)
*B60K 6/50* (2007.10)
*B60K 1/00* (2006.01)
*B60K 6/40* (2007.10)
*B60K 17/356* (2006.01)
*F16H 3/44* (2006.01)

(52) U.S. Cl.
CPC ... *B60K 6/50* (2013.01); *B60K 1/00* (2013.01); *B60K 6/40* (2013.01); *B60K 17/356* (2013.01); *F16H 3/44* (2013.01); *B60K 2001/001* (2013.01); *Y10S 903/902* (2013.01); *Y10T 477/33* (2015.01)

(58) Field of Classification Search
None
See application file for complete search history.

(56) References Cited

U.S. PATENT DOCUMENTS

| 5,387,161 A * | 2/1995 | Shibahata .......................... 475/5 |
| 6,024,182 A | 2/2000 | Hamada et al. |
| 6,719,654 B2 * | 4/2004 | Deichl et al. ...................... 475/5 |
| 6,945,347 B2 * | 9/2005 | Matsuno ....................... 180/242 |
| 7,041,023 B2 * | 5/2006 | Bologna ...................... 475/150 |
| 7,174,978 B2 * | 2/2007 | Taniguchi et al. ........... 180/65.1 |
| 7,297,083 B2 * | 11/2007 | Duncan ............................ 475/5 |
| 7,311,631 B2 * | 12/2007 | Kushino ....................... 475/221 |
| 7,588,511 B2 * | 9/2009 | Tangl et al. .................... 475/150 |
| 7,686,723 B2 * | 3/2010 | Schondorf ....................... 475/5 |
| 7,786,640 B2 * | 8/2010 | Sada et al. ..................... 310/112 |
| 7,832,514 B2 * | 11/2010 | Janson .......................... 180/65.6 |
| 8,226,514 B2 * | 7/2012 | Grochowski et al. ............ 475/5 |
| 8,337,352 B2 * | 12/2012 | Morrow et al. ................... 475/5 |
| 8,444,518 B2 * | 5/2013 | Tanae et al. ...................... 475/5 |
| 8,758,179 B2 * | 6/2014 | Diemer et al. .................... 475/5 |
| 8,905,881 B2 * | 12/2014 | Sada et al. ........................ 475/5 |
| 2005/0006164 A1 | 1/2005 | Teraoka |
| 2006/0079370 A1 | 4/2006 | Kushino |
| 2009/0023529 A1* | 1/2009 | Sanji et al. ........................ 475/5 |
| 2009/0188732 A1 | 7/2009 | Janson |

FOREIGN PATENT DOCUMENTS

EP 0773127 A2 5/1997
WO 2007131616 A2 11/2007

OTHER PUBLICATIONS

Extended European Search Report Dated Feb. 26, 2014, Applicant Volvo Car Corporation, Application No. 13185708.8-1752, 5 Pages.

* cited by examiner

Primary Examiner — Dirk Wright
(74) Attorney, Agent, or Firm — Brooks Kushman P.C.

(57) ABSTRACT

A rear drive unit for a hybrid electric motor vehicle is provided. The rear drive unit comprises a rear link/drive shaft and an electrical motor/generator.

20 Claims, 3 Drawing Sheets

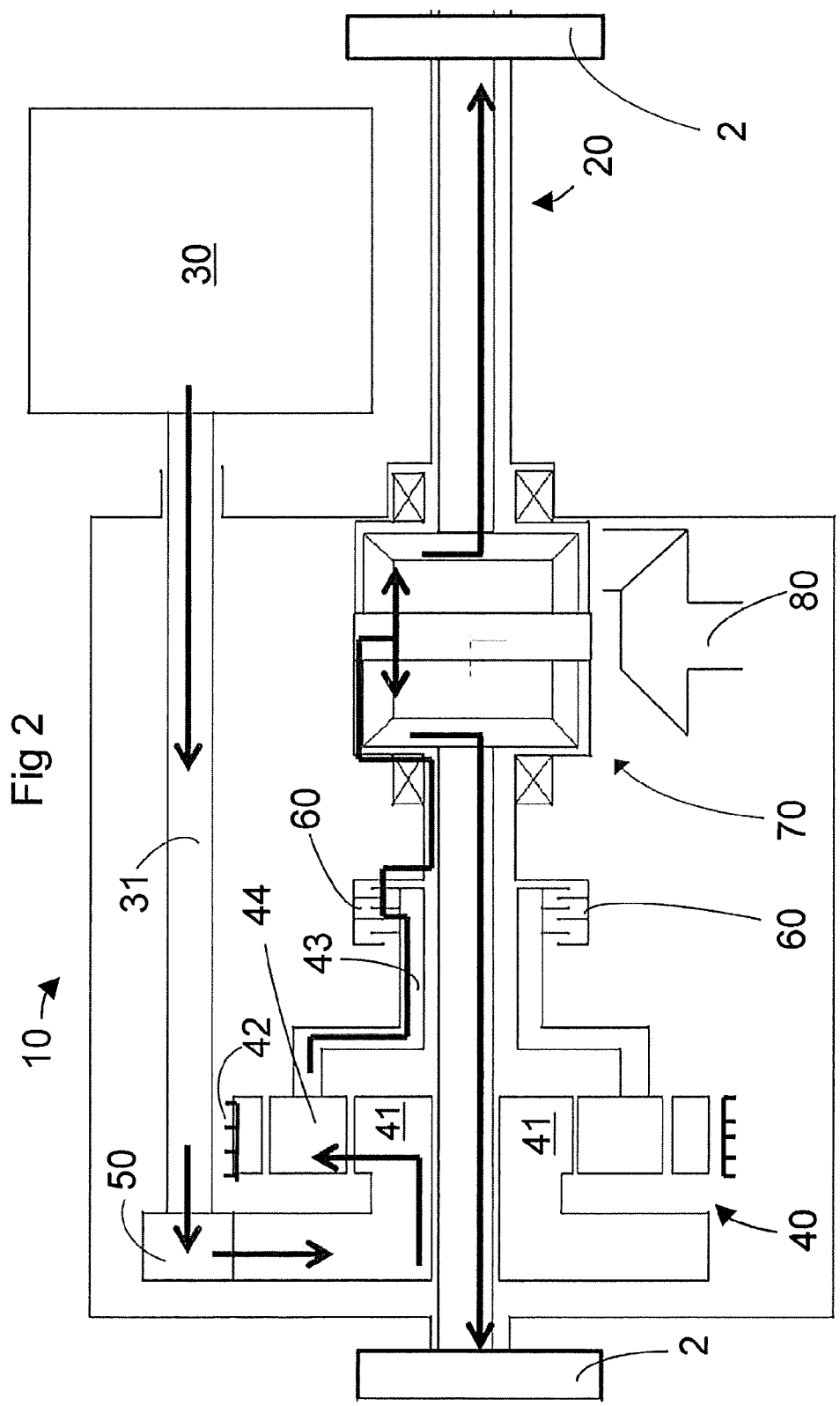

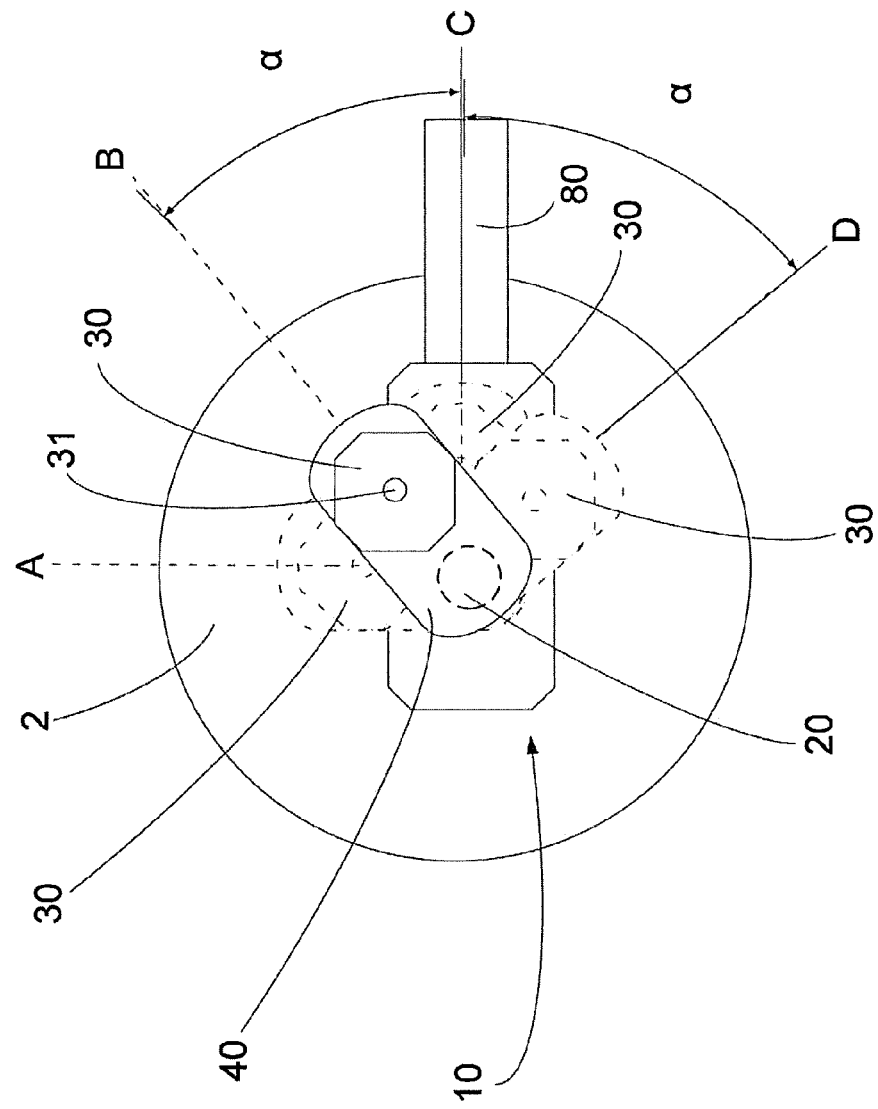

REAR DRIVE UNIT FOR A HYBRID ELECTRIC MOTOR VEHICLE

CROSS-REFERENCE TO RELATED APPLICATIONS

This application claims foreign priority benefits under 35 U.S.C. §119(a)-(d) to European patent application number EP 13185708.8, filed Sep. 24, 2013, which is incorporated by reference in its entirety.

TECHNICAL FIELD

The present disclosure relates to a rear drive unit (RDU), in particular for a hybrid electric motor vehicle comprising an internal combustion engine and an electric motor/generator.

BACKGROUND

Today, there exist different types of Kinetic Energy Recovery Systems (KERSs) in vehicles driven by internal combustion engines (ICEs). Such KERSs are also used in hybrid electric motor vehicles having power trains with multiple power sources including an electric motor for driving vehicle wheels independently of or in combination, depending on driving conditions, with the ICE, and depending on the state of charge of a traction battery, and the power source(s), i.e., the electric motor/generator and/or the ICE, that most efficiently fulfils the present demand of power imposed by the operator of the vehicle and/or road conditions.

One example of such a KERS in a hybrid electric motor vehicle is disclosed in US 2009/0188732 A1.

However, the constant increasing demand on lowering costs for power trains, hence also hybrid electric power trains, and reducing both fuel consumption and the overall environmental stress and influence from manufacture and maintenance of parts making up vehicles over the whole life cycle for vehicle fleets have created a need for further improvement of such KERS systems.

SUMMARY

One object of the present disclosure is to overcome at least some of the problems and drawbacks mentioned above.

These and further objects are achieved by a rear drive unit for a hybrid electric motor vehicle, the rear drive unit comprising a rear link/drive shaft and an electrical motor/generator, characterized in that the electrical motor/generator is coupled to a gear set, which gear set in turn is coupled to the link/drive shaft, whereby the electrical motor/generator is arranged offset in the radial direction in relation to the link/drive shaft. The effect and advantage of this inventive offset arrangement of an electrical motor and generator in a hybrid electric motor vehicle are that installation and replacement of the electrical motor/generator are made easier by eliminating the need of disassembling major parts of the rear drive unit before being able to dismount the electrical motor/generator.

In some embodiments, the electrical motor/generator is coupled to an input shaft, which input shaft in turn is coupled to the gear set.

In some embodiments, the input shaft is essentially parallel to the link shaft.

In some embodiments, the input shaft is offset in relation to the link shaft in the direction of the front of the hybrid electric motor vehicle.

In some embodiments, the input shaft is arranged offset above the link shaft.

In some embodiments, the input shaft is centered/aligned with the electrical motor/generator.

In some embodiments, the gear set is a planetary gear set.

In some embodiments, a spur gear unit is coupled between the gear set and the electrical motor/generator.

In some embodiments, the gear ratio between the electrical motor/generator and the gear set is in the range of 1 to 18 and 1 to 25.

In some embodiments, the gear set is coupled to the link shaft by means of a disconnect clutch.

In some embodiments, the electrical motor/generator is placed at one output end of the link shaft and the gear set is placed at another output end of the link shaft.

In some embodiments, the electrical motor/generator and the gear set are placed at opposite sides of the rear drive unit.

The above and further objects are also achieved by a hybrid electric motor vehicle comprising a rear drive unit according to above.

One effect and advantage of the above is that installation and replacement of the electrical motor/generator are made easier by eliminating the need of disassembling major parts of the rear drive unit before being able to dismount the electrical motor/generator. Another effect and advantage of the above is that available space around the rear drive unit is easier and more efficiently utilized improving the packing of vehicle components, including this rear drive unit and its included parts. Another effect and advantage of the above is that regenerative braking is enabled. Another effect and advantage of the above is that more power and torque from the power sources of the vehicle are provided. Moreover, the basic principles or structures of the rear drive unit do not have to be changed radically to be able to implement the invention. Furthermore, no new testing of the rear drive unit has to be performed to prove that the implementation of the invention fulfils corresponding requirements.

Further objects and features of the present disclosure will appear from the following detailed description of embodiments of the disclosure.

BRIEF DESCRIPTION OF THE DRAWINGS

FIG. 2 shows a schematical representation of the rear drive unit according to the disclosure in cross-section; and FIG. 3 is a schematical side view of different positions of an electric motor/generator in the rear drive unit according to the disclosure.

DETAILED DESCRIPTION

Figure 1:
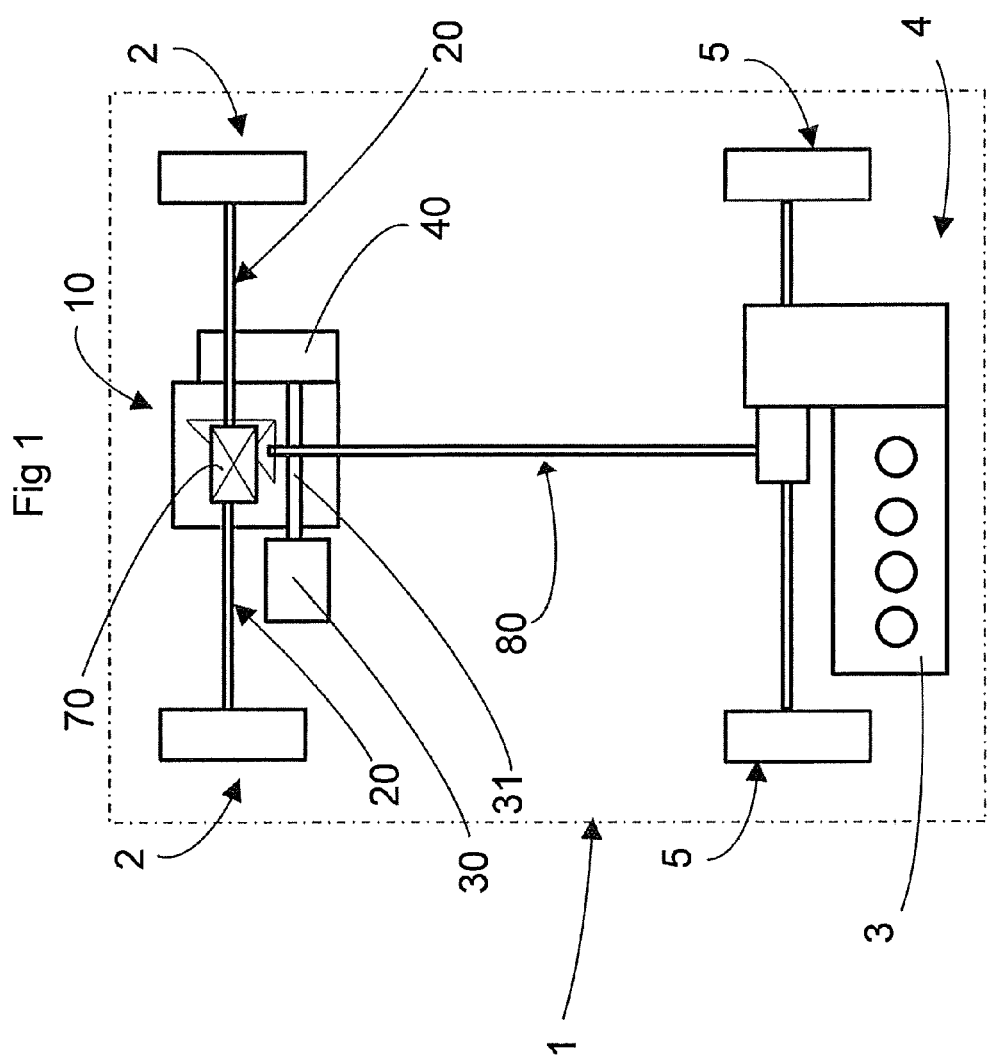
FIG. 1 shows a schematic representation of a hybrid electric motor vehicle having a rear drive unit according to the disclosure in planar view from above.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

As described above, the present disclosure relates to a rear drive unit 10 (RDU) for a hybrid electric motor vehicle 1 as shown in FIGS. 1 and 2. The hybrid electric motor vehicle 1 also comprises at least one pair of rear vehicle wheels 2, at least one internal combustion engine (ICE) 3, a front drive unit (FDU) 4, and at least one pair of front vehicle wheels 5.

Moreover, the hybrid electric motor vehicle 1 also comprises a transmission driving the front drive unit and front wheel via front drive shafts by means of the ICE 3, but these transmission parts will not be explained in further detail as such a transmission is common knowledge for a skilled person.

Moreover, the RDU 10 of the hybrid electric motor vehicle 1 comprises at least one link/drive shaft 20 for each rear vehicle wheel 2 (the same goes for each front wheel 5 but, as mentioned above, this front link/drive shaft has no reference numeral in FIG. 1), such that the rear wheels 2 may be driven for propelling the vehicle 1, by means of the ICE 3 and/or a at least one electrical motor and generator (E-motor) 30, or transfer rotational energy in the reverse direction for electric energy generation, e.g., by regenerative braking, for charging a battery (not shown) by means of the E-motor 30 working as a generator instead.

The RDU 10 of the hybrid electric motor vehicle 1 comprises the E-motor 30, at least one input shaft 31 and at least one gear set 40, e.g., a planetary gear set working as a first gear/transmission ratio in the RDU 10. The input shaft 31 is connected between the E-motor 30 and the gear set 40. The gear set 40, if being a planetary gear, comprises a sun gear 41, a ring gear 42, and carrier 43 and planet gears 44. The RDU 10 also comprises a transfer gear 50 being a spur gear unit working as a second gear/transmission ratio in the RDU. This spur gear unit 50 is coupled between the gear set 40 and E-motor 30.

The E-motor 30 of the RDU 10 is controlled by an electronic control unit (not shown) in a known way and this control of the E-motor 30 will therefore not be explained in more detail.

The RDU 10 comprises, as an option, i.e., not required, a disconnect clutch 60, which disconnect clutch may control the power flow in driving mode through the power train of the rear drive unit. Hence, the gear set 40 is coupled to the link shafts 20 by means of the disconnect clutch. The driving mode and its power flow are schematically shown with arrows in FIG. 2 and the driving mode and the direction of the arrows shown there are created by closing the disconnect clutch 60 and forming a first power path. This closed disconnect clutch 60 couples, in an operative and rotative way, the E-motor 30 and its input shaft 31 to the gear set 40 and each drive shaft 20 together, such that the E-motor may rotate and thereby rotate the rear wheels 2 for drive. The KERS function, i.e., a regenerating mode, is achieved along the same power flow path but in the opposite direction of the shown arrows in FIG. 2 forming a second power path being a regenerative one. Hence, in that case, the E-motor 30 works as a generator charging at least one traction battery (not shown). When the disconnect clutch 60 is open/opened/disengaged, the rotational transferal between the E-motor 30 and its input shaft 31 to the gear set 40 and each drive shaft 20 and each rear wheel 2 and vice versa is released and void, whereby the planetary gear set 40, the transfer gear 50, and associated shafts 20, 31 together with the E-motor 30 stand still.

The disconnect clutch 60 may also be discarded, i.e., the gear set 40 may be secured directly to the concerned drive shaft 20. The disconnect clutch 60 may be a wet clutch.

Furthermore, the RDU 10 comprises a differential 70 for transferring power to the rear wheels 2 by means of the drive shafts 20 being connected at one end to the differential 70 and at the other end to one associated rear wheel 2. The differential 70 in turn is in an optional way rotatively coupled to the E-motor 30 via the gear set 40 through the transfer gear 50 and the input shaft 31 of the E-motor.

The gear set 40 may also be secured directly to the concerned differential 70.

The gear set 40 has its carrier 43 secured to the differential 70 at one end and has the planet gears 44 rotatively coupled to the other end of the carrier 43, which planet gears 44 mesh with ring gear 42 and sun gear 41. The sun gear 41 is in turn driveably connected to the transfer gear 50 being secured to the input shaft 31 of the E-motor 30. The RDU 10 may comprise, as an option, but not required, for transferring power to the rear wheels 2, a cardan shaft or propeller shaft 80 connected at a front end to the front drive unit (FDU) 4 and at an rear end to the differential 70 as shown in FIG. 1. This optional solution means that no mechanical coupling between the front drive unit 4 and the rear drive unit 10 is necessary but of course possible, if desired, by eliminating the cardan shaft 80 for no mechanical coupling between the FDU 4 and the RDU 10 via the differential 70 or adding the cardan shaft 80 to the differential for mechanically and operatively connecting the FDU 4 and the RDU. Hence, if the cardan shaft 80 is not used, FIG. 1 would then not show the propeller shaft 80 between the drive units 4 and 10. Hence, the FDU 4 and the RDU 10 would then be able to work truly independently of each other. This solves integration of an electrical KERS with a mechanical all wheel drive (AWD) system at the RDU 10, i.e., the rear axle. This also enables that two different power sources are used as a common AWD system, but with one electrical rear drive and one ICE front drive. This is done by the FDU 4 and the RDU 10 working and driving the front wheel 5 and the rear wheels 2 independently of each other, but synchronized, for creating an electric rear wheel driving and an internal combustion front driving, achieving a hybrid AWD system. Moreover, the E-motor 30 may be used for "topping-up" the propelling effect of the ICE 3 during driving by aiding or biasing the rear wheels 2 on demand from the vehicle driver.

According to the disclosure, the range of torque and power provided by means of the propelling sources, i.e., the FDU 4 and/or the RDU 10, is improved for the hybrid electric motor vehicle 1 in both two-wheel drive mode and AWD mode.

For this solution a new transmission (a helical gear pair in combination with an epicyclic gear set) has been developed. The E-motor 30 transmission with its gear sets 40 and 50 and associated rotational shaft 31 in the RDU 10 also has a possibility to disconnect by the disconnect/wet clutch 60, as described above.

In FIG. 1, the E-motor 30 is placed closer to the output end of one of the link shafts 20 (i.e., closer to the output end of the right link shaft 20 as defined in the forwards driving direction of the vehicle 1 but shown as the left shaft in FIG. 1) and the gear set 40 is placed closer to the output end of the other link shaft (i.e., closer to the output end of the left link shaft 20 as defined in the forwards driving direction of the vehicle 1 but shown as the right link shaft in FIG. 1). The E-motor 30 and the gear set 40 are placed at opposite sides of the RDU 10.

The rear drive unit 10 of the hybrid electric motor vehicle 1 has its E-motor 30 arranged offset in the radial direction in relation to each drive shaft 20 by means of its input shaft 31. The input shaft 31 extends substantially along each drive shaft 20 in a side-by-side relationship with at least one of the drive shafts. The input shaft 31 of the E-motor 30 is essentially parallel to the drive shaft 20.

The parallelism or non-parallelism between the input shaft 31 and any of the drive shafts 20 depends on the required inclination of the respective shafts. The input shaft 31 and any of the drive shafts 20 may of course extend in a diverging direction or angle of divergence in relation to each other or these shafts 31, 20 may extend in a converging direction or angle of convergence in relation to each other.

In FIG. 3, which is a schematical side view of the RDU 10 and one rear wheel 2, the input shaft 31 is shown arranged offset in relation to the link shaft 20 in the direction of the front of the hybrid electric motor vehicle 1, i.e., towards the cardan shaft 80 (if such shaft is used) being in a direction towards the FDU 4 in FIG. 1.

FIG. 3 shows examples of different arrangements of the input shaft 31 offset above the link shaft 20, and offset below the link shaft 20. The input shaft 31 is arranged offset above the link shaft 20 at an angle α being in the range of about 0° (in a horizontal plane position C being the rightmost position of FIG. 3) to about 270° (in a position D below the link shaft 20 as measured counter clockwise from the horizontal plane position C) or even to about 360° close to position C. The arrangement of the E-motor 30, its input shaft 31, the gear set 40 and related components in any of these angled positions may be in any location in a full circle but the specific choice of position A, B, C or D or any other position in FIG. 3 depends on the available space around the RDU 10 in relation to other parts of the vehicle 1, e.g., a fuel tank or the like, and in order to solve the packaging issues for the drive shaft installation as available space in modern vehicles is scarce. Hence, the E-motor 30 and related parts may be placed in top position A being about 90° from the horizontal plane position C. The E-motor 30 and related parts may be placed in the preferred intermediate position B at the angle α being in the range of about 10° to about 80° from the horizontal plane position C. The E-motor 30 and related parts may also be placed in position D at angle α being in the range of about 280° to about 350° from the horizontal plane position C counter clockwise.

As shown in FIGS. 1 and 2, the input shaft 31 is centered, i.e., aligned with the E-motor 30.

A preferred gear ratio between the E-motor 30 and the gear set 40 is in the range of 1 to 18 and 1 to 25. Other gear ratios are possible, e.g., between 1 to 10 and 1 to 30. However, the preferred gear ratio is 1 to 18. These gear ratios depend on the demands to be complied with and how the E-motor 30 is to be used/applied/implemented in a corresponding RDU 10. The gear ratios also depend on the design/structure/construction of the E-motor and its properties/characteristic, and which number of revolutions the E-motor can handle. Hence, this mean that other gear ratios are equally possible, e.g., between 1 to 40 or between 1 to 50 or even higher, in the future.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Nomenclature
1 Hybrid electric motor vehicle
2 Rear vehicle wheels
3 Internal combustion engine
4 Front drive unit (FDU)
5 Front vehicle wheels
10 Rear drive unit (RDU)
20 Link/Drive shaft
30 Electrical motor/generator
31 Input shaft
40 Gear set/Planetary gear set (first ratio)
41 Sun gear
42 Ring gear
43 Carrier
44 Planet gears
50 Transfer gear/Spur gear unit (second ratio)
60 Disconnect clutch
70 Differential
80 Cardan/Propeller shaft

What is claimed is:

1. A rear drive unit for a hybrid electric motor vehicle, the rear drive unit comprising:
   a rear link/drive shaft;
   an electrical motor/generator;
   a gear set coupled to the electrical motor/generator and the link/drive shaft, such that the electrical motor/generator is arranged offset in a radial direction in relation to the link/drive shaft; and
   a differential connected to the link/drive shaft;
   wherein the electrical motor/generator is disposed on a first side of the differential, and the gear set is entirely disposed on an opposite second side of the differential.

2. The rear drive unit according to claim 1 further comprising an input shaft coupled between the electrical motor/generator and the gear set.

3. The rear drive unit according to claim 2 wherein the input shaft is essentially parallel to the link/drive shaft.

4. The rear drive unit according to claim 2 wherein the input shaft is configured to be offset in relation to the link/drive shaft toward a front of the hybrid electric motor vehicle when the rear drive unit is mounted in the hybrid electric motor vehicle.

5. The rear drive unit according to claim 4 wherein the input shaft is arranged offset above the link/drive shaft.

6. The rear drive unit according to claim 4 wherein the input shaft is centered/aligned with the electrical motor/generator.

7. The rear drive unit according to claim 1 wherein the gear set is a planetary gear set.

8. The rear drive unit according to claim 7 further comprising a spur gear unit coupled between the gear set and the electrical motor/generator.

9. The rear drive unit according to claim 7 wherein the gear ratio between the electrical motor/generator and the gear set is in the range of 1 to 18 and 1 to 25.

10. The rear drive unit according to claim 1 further comprising a disconnect clutch that couples the gear set to the link/drive shaft.

11. The rear drive unit according to claim 1 wherein the electrical motor/generator and the gear set are placed at opposite sides of the rear drive unit.

12. The rear drive unit according to claim 1 further comprising a longitudinally extending propeller shaft connected to the differential, wherein the electrical motor/generator is disposed on a first lateral side of the propeller shaft, and the gear set is entirely disposed on an opposite second lateral side of the propeller shaft.

13. The rear drive unit according to claim 1 further comprising a disconnect clutch disposed between the gear set and the differential.

14. The rear drive unit according to claim 2 wherein the input shaft is configured to be offset below the link/drive shaft when the rear drive unit is mounted in the hybrid electric motor vehicle.

15. A hybrid electric motor vehicle comprising:
   a rear drive unit including a rear link/drive shaft, an electrical motor/generator, a gear set coupled to the electrical motor/generator and the link/drive shaft, such that the electrical motor/generator is arranged offset in a radial direction in relation to the link/drive shaft, and a differential connected to the link/drive shaft, wherein the electrical motor/generator is disposed on a first side of the differential, and the gear set is entirely disposed on an opposite second side of the differential.

16. The vehicle according to claim 15 wherein the rear drive unit further comprises a longitudinally extending propeller shaft connected to the differential, wherein the electrical motor/generator is disposed on a first lateral side of the propeller shaft, and the gear set is entirely disposed on an opposite second lateral side of the propeller shaft.

17. The vehicle according to claim 15 wherein the rear drive unit further comprises an input shaft coupled between the electrical motor/generator and the gear set, and wherein the input shaft is offset in relation to the link/drive shaft toward a front of the vehicle.

18. The vehicle according to claim 17 wherein the input shaft is offset below the link/drive shaft.

19. The vehicle according to claim 17 wherein the rear drive unit further comprises a disconnect clutch disposed between the gear set and the differential, wherein the disconnect clutch is operable to rotatively couple the gear set to the link/drive shaft.

20. The vehicle according to claim 15 wherein the rear drive unit further comprises an input shaft coupled between the electrical motor/generator and the gear set, and wherein the input shaft is offset below the link/drive shaft.

\* \* \* \* \*